(12) United States Patent
Cilia

(10) Patent No.: US 10,300,494 B1
(45) Date of Patent: May 28, 2019

(54) METHOD OF PLANT RESIN SEPARATION AND EXTRACTION

(71) Applicant: Tetragrow LLC, Calistoga, CA (US)

(72) Inventor: David M Cilia, Calistoga, CA (US)

(73) Assignee: TETRAGROW INC., Calistoga, CA (US)

( * ) Notice: Subject to any disclaimer, the term of this patent is extended or adjusted under 35 U.S.C. 154(b) by 0 days.

(21) Appl. No.: 15/640,111

(22) Filed: Jun. 30, 2017

Related U.S. Application Data

(63) Continuation-in-part of application No. 14/634,794, filed on Feb. 28, 2015, now Pat. No. 9,718,065.

(60) Provisional application No. 61/946,536, filed on Feb. 28, 2014.

(51) Int. Cl.
| | | |
|---|---|---|
| B03B 1/00 | (2006.01) |
| B03B 5/28 | (2006.01) |
| B03B 7/00 | (2006.01) |
| B01D 11/02 | (2006.01) |

(52) U.S. Cl.
CPC .............. *B03B 7/00* (2013.01); *B03B 5/28* (2013.01); *B01D 11/0253* (2013.01); *B03B 1/00* (2013.01)

(58) Field of Classification Search
CPC .... B03B 7/00; B03B 1/00; B03B 5/28; B01D 11/0253
USPC ............... 209/155, 162, 168, 169, 194, 197
See application file for complete search history.

(56) References Cited

U.S. PATENT DOCUMENTS

| | | | | |
|---|---|---|---|---|
| 2,922,521 A * | 1/1960 | Schranz | ........... | B03B 5/623 |
| | | | | 209/163 |
| 4,051,771 A | 10/1977 | Miyata et al. | | |
| 4,795,651 A * | 1/1989 | Henderson | ........... | B03B 5/28 |
| | | | | 426/456 |
| 4,964,576 A * | 10/1990 | Datta | ........... | B02C 17/16 |
| | | | | 209/168 |
| 6,158,591 A * | 12/2000 | Delp | ........... | B01D 11/0257 |
| | | | | 209/17 |
| 6,988,622 B1 * | 1/2006 | Victor | ........... | A23N 4/24 |
| | | | | 209/156 |
| 8,640,877 B1 | 2/2014 | Pastorius | | |
| 8,955,687 B1 | 2/2015 | Dews et al. | | |
| 9,066,910 B2 * | 6/2015 | Rosenblatt | ........... | A61K 36/185 |
| 2009/0250383 A1 | 10/2009 | Young et al. | | |
| 2016/0160439 A1 * | 6/2016 | Mohammadi | ........... | D21F 11/00 |
| | | | | 162/109 |

FOREIGN PATENT DOCUMENTS

WO  200400919 A2  1/2014

OTHER PUBLICATIONS

"Home-made hash", by Wombat, dated Mar. 8, 2005, downloaded from <http://www.poUv/video/2005/03/08/4117/>.

(Continued)

*Primary Examiner* — Terrell H Matthews
(74) *Attorney, Agent, or Firm* — Edward S. Sherman

(57) ABSTRACT

A process for trichome separation from plant matter deploys water slurry agitation and/or dry sieving to produce a mixture of solid trichomes and similar sized plant debris. The plant debris in each separate fraction is then removed by gravity filtration in a dense inert liquid, which is preferably a salt or brine solution. The desirable trichomes or trichome glands float on the dense liquid, while the undesirable vegetative matter sinks to the bottom of the brine containing vessel. The trichomes are readily removed and washed before further processing.

22 Claims, 5 Drawing Sheets

(56) References Cited

OTHER PUBLICATIONS

"Inside the Trichome", by Bubbleman and Jeremiah Vandermeer, published on Cannabis Culture on Jun. 12, 2009.

* cited by examiner

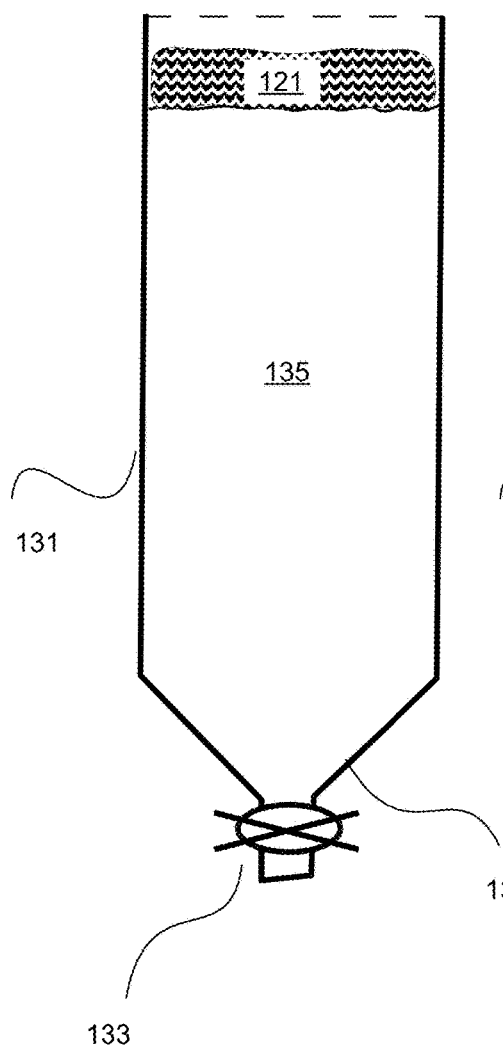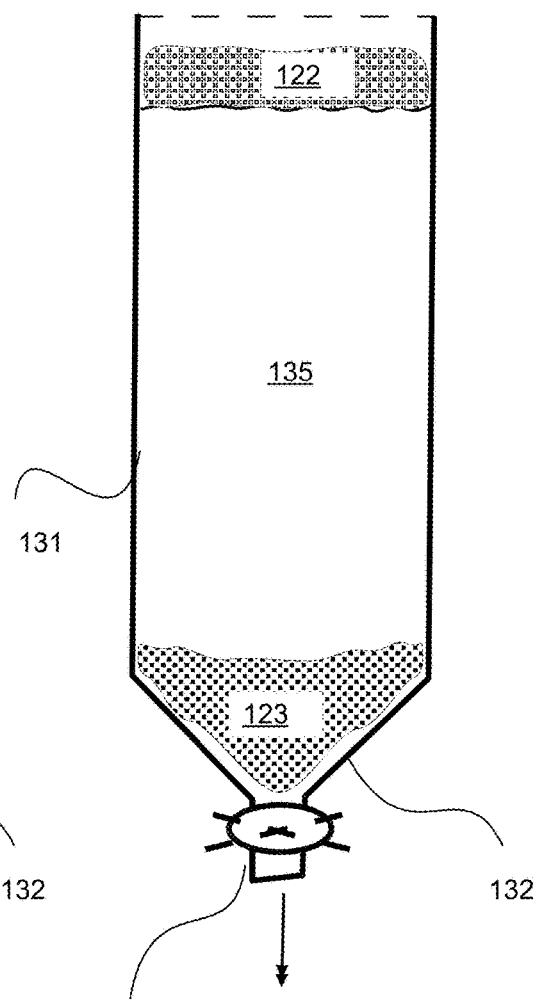

US 10,300,494 B1

METHOD OF PLANT RESIN SEPARATION AND EXTRACTION

CROSS REFERENCE TO RELATED APPLICATIONS

The present application is a Continuation-in-part of and claims the benefit of priority to the US Non-Provisional patent application of the same title having application Ser. No. 14/634,794 that was filed on 28 Feb. 2015, and is incorporated herein by reference.

The present application also claims the benefit of priority to the US Provisional patent application of the same title having application Ser. No. 61/946,536 that was filed on Feb. 28, 2014, and is incorporated herein by reference.

BACKGROUND OF INVENTION

The field of the present invention is the extraction of resins containing organic compounds from resinous plants, and more particularly to the separation of resin from resin-bearing glandular trichomes being from none or low resin bearing plant matter.

A number of plant varieties produce commercially valuable isoprene derivatives and phenolic compounds such as terpenes, alpha acids, beta acids, flavonoids and terpenoids in cell assemblies know as trichomes or more specifically, in the glands of glandular trichomes. Portions of different plants are rich in trichomes containing compounds of interest in commercial and medicinal applications. Conventional extractive processes may not be adequate in preserving volatile and/or oxidation-sensitive compounds.

Conventional extraction and separation methods utilize solvents which may be polar, non-polar or combinations thereof in order to extract and separate desirable substances. Conventional extraction methods are expensive to conduct safely and may introduce undesired compounds by collateral extraction. Commonly extracted undesirable compounds may include pigments such as anthocyanin, chlorophyll, tannins, saponins and lipids from cellulosic and other plant materials.

Further, as plants mature, many glands of glandular trichomes increase in size, mass and chemical composition. Plant cells associated with the trichomes biosynthesize phenolic compounds including terpenoids such as cannabinoids and humulones. However, at harvest time, when the plant is deemed to have reached a peak in the content of desired compounds, trichome assemblies may be in a range of sizes. It is believed that larger trichomes may have a different composition than the smaller trichomes. Hence, it would also be desirable to separate trichomes by size before chemical extraction or separation of such mixture of compounds from the trichomes.

Trichome and trichome gland assemblies can be separated from the bulk of undesirable plant material by sieving procedures. Larger trichomes can be harder to separate from undesirable plant matter that do not contain desired chemical species While relatively small trichome glands can be separated from undesirable plant materials by sieving procedures, larger trichomes can be harder to separate, as larger sized sieve fractions contain greater amounts of undesirable plant material thereby diluting the net content of desirable compounds in trichomes and trichome glands. Physical dilution necessitates significant fragmentation of the less desired plant matter. However, as resin bearing trichomes are sticky, physical separation by dry or wet sieving processes are problematic because a large fraction of plant matter fragments of comparable size to the desired trichomes are generated from the mechanical force of agitation, chopping or grinding of the plant matter to release the desirable trichomes and/or trichome glands.

Accordingly, it is an object of the present invention to provide an improved process for separating desirable trichomes and/or specific trichome structures from undesirable trichome parts and/or plant matter that overcomes the aforementioned disadvantages. Such undesirable trichome parts include trichome stems that do not contain desired compounds, or non-resin bearing trichomes.

The above and other objects, effects, features, and advantages of the present invention will become more apparent from the following description of the embodiments thereof taken in conjunction with the accompanying drawings

SUMMARY OF INVENTION

In the present invention, the first object is achieved by providing a method of trichome separation from plants, the method comprising the steps of obtaining a trichome bearing plant material, agitating the plant material, introducing the plant material in fluid having a density of at least about 1.01 gm per cc to float the trichomes on the fluid, separating the floating trichomes from the fluid, removing any residue of the fluid from the separated trichomes.

A second aspect of the invention is characterized by a method of trichome separation from plants, the method comprising the steps of obtaining a trichome bearing plant material, agitating the plant material, introducing the plant material in fluid having a density of at least about 1.01 gm per cc to float the trichomes on the fluid, separating the floating trichomes from the fluid, removing any residue of the fluid from the separated trichomes.

Another aspect of the invention is characterized by a method of trichome separation from plants, the method comprising the steps of obtaining a trichome bearing plant material, agitating the plant material to release trichomes from the plant material, introducing the plant material in fluid having a density of at least about 1.01 gm per cc the plant matter from which trichomes were released sinks in the fluid, separating the trichomes from the fluid, removing any residue of the fluid from the separated trichomes.

Another aspect of the invention is characterized by any of the above methods in which the fluid has a density of at least about 1.05 gm per cc.

Another aspect of the invention is characterized by any of the above methods in which the fluid has a density of at least about 1.08 gm per cc.

Another aspect of the invention is characterized by any of the above methods in which said step of agitating the matter includes aggressive maceration of the plant material as the trichomes are released there from such that the macerated plant material will sink in the fluid.

Another aspect of the invention is characterized by any of the above methods in which said step of agitating occurs before the plant material is introduced into the fluid having a density of at least about 1.01 gm per cc.

Another aspect of the invention is characterized by any of the above methods in which said step of agitating occurs after the plant material is introduced into the fluid having a density of at least about 1.01 gm per cc.

Another aspect of the invention is characterized by any of the above methods wherein the plant is a from a genera selected from the group consisting of *Populus, Nicotiana, Cannabis, Pharbitis, Apteria, Psychotria, Mercurialis,*

*Chrysanthemum, Polypodium, Pelargonium, Mimulus, Matricaria, Monarda, Solanum, Achillea, Valeriana, Ocimum, Medicago, Aesculus, Plumbago, Pityrogramma, Phacelia, Avicennia, Tamarix, Frankenia, Limonium, Foeniculum, Thymus, Salvia, Kadsura, Beyeria, Humulus, Mentha, Artemisia, Nepta, Geraea, Geraniaceae, Pogostemon, Majorana, Cleome, Cnicus, Parthenium, Ricinocarpos, Hymennaea, Larrea, Primula, Phacelia, Dryopteris, Plectranthus, Cypripedium, Petunia, Datura, Mucuna, Ricinus, Hypericum, Myoporum, Acacia, Diplopeltis, Dodonaea, Halgania, Cyanostegia, Prostanthera, Anthocercis, Olearia, Viscaria.*

Another aspect of the invention is characterized by any of the above methods wherein said agitating during said step of floating is by one of more of shaking, stirring, re-circulating water jets, and agitation with ultrasound.

Another aspect of the invention is characterized by any of the above methods wherein the plant is from a genus selected from the group consisting Cannabaceae and Lamiaceae family.

The above and other objects, effects, features, and advantages of the present invention will become more apparent from the following description of the embodiments thereof taken in conjunction with the accompanying drawings.

BRIEF DESCRIPTION OF DRAWINGS

FIGS. 2A and 2B are schematic diagram of the fluid separation step in FIG. 1.

DETAILED DESCRIPTION

Figure 1:
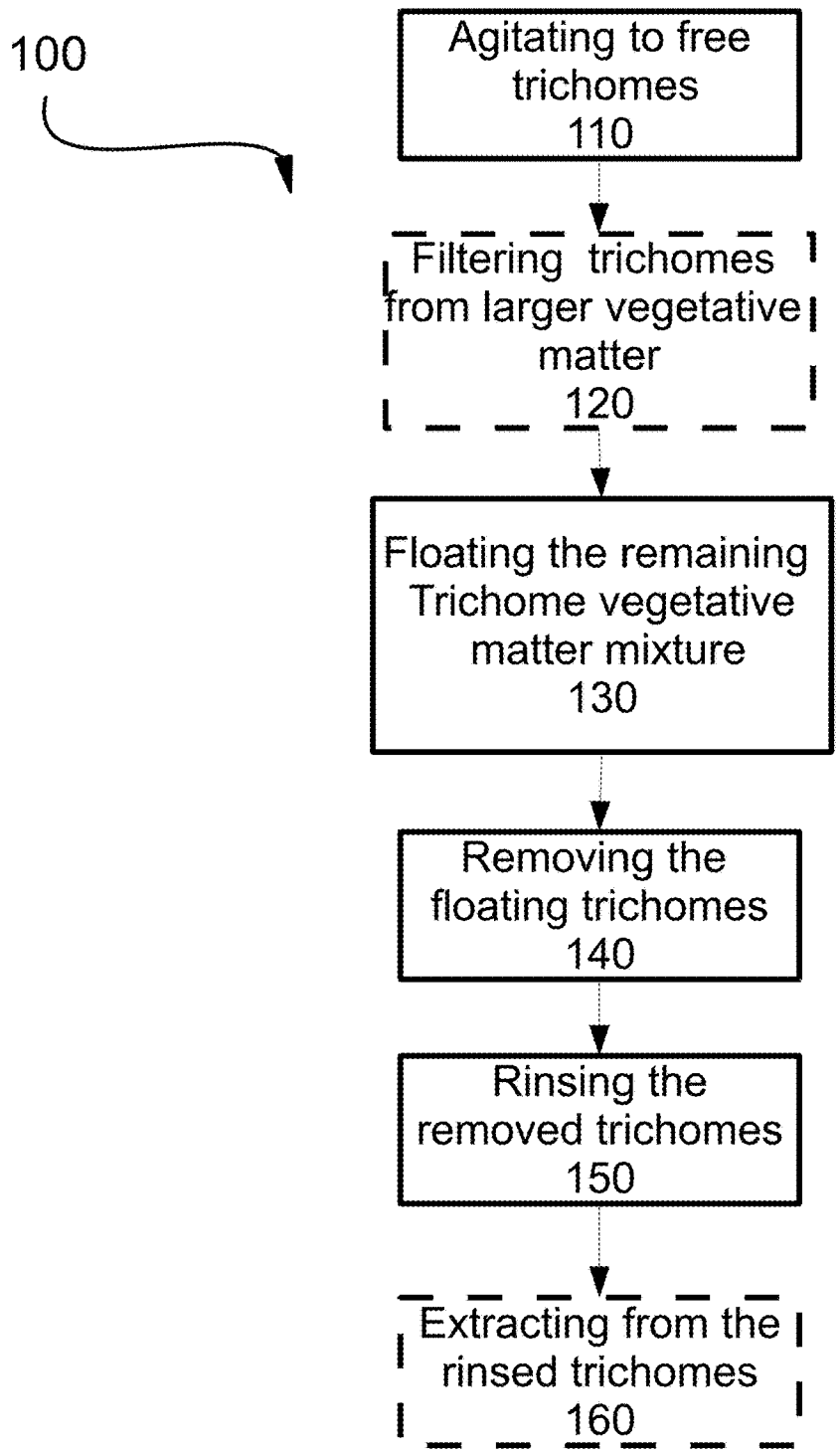
FIG. 1 is a schematic process flow chart.

Referring to FIGS. 1-5, wherein like reference numerals refer to like components in the various views, there is illustrated therein a new and improved Method of Plant Resin Separation and Extraction, generally denominated 100 herein.

In accordance with the present invention, process 100 of FIG. 1 comprises a series of steps for separating resin rich glandular trichomes from vegetative matter. Terpenoids including cannabinoids and other compounds secreted within glandular trichomes have significant commercial applications. Glandular trichomes occur most abundantly on the floral calyxes and associated leaves on the inflorescences of female *Cannabis* plants. The secreted compounds frequently remain in and swell the trichome glands, which are cell clusters, giving them a resinous character.

The particular, sieve sizes, methods of agitation, sieve fractions deployed in one or more separation processes in step 110-130 will depend on the nature of the target glandular trichomes produced by the plant. In step 110, the physical agitation of the plant matter with the desired trichomes is employed so that terpenoid or cannabinoid-rich trichomes and trichome glands break free of the floral calyxes, bracts as well as the leaves they may form on or stick to. Physical agitation of plant matter (110) is preferably done in an ice and water slurry as cold temperatures help increase the efficacy of mechanical forces in breaking free trichomes and resin-containing trichome glands from bulk plant material. Prior to step 110, plant matter may or may not be chopped up or ground in order to help release trichomes and trichome glands from plant matter during step 110.

A preferred method of agitation in step 110 is wet agitation by enclosing the trichome bearing plant matter in a wide mesh sieve bag, which in the case of *cannabis* is preferably 220 micron. The bag is then agitated in an ice and water bath slurry. As the plant matter is agitated, trichomes of various sizes are released into the ice and water slurry through the holes in the mesh bag or equivalent containment vessel. The trichomes are ultimately removed from the bulk of the plant matter when the water is drained as the bulk vegetative matter is retained in the bag. A commercial washing machine can be used for this purpose with the drain hose line used to collect the trichome and other plant matter that exits the holes in the mesh bag.

Alternatively, the inventive process will also work on dry-sieved material. Such dry sieving of material is preferably performed at cold temperature, as for example like hops which are typically dry sieved at −30 C.

However, wet sieving offers advantages over dry sieving as a considerable amount of undesirable water soluble components will be removed when the water is drained from the final filter fraction(s).

Cold temperatures will have a dramatic effect in either wet or dry method on making the desirable oil glands less sticky and harder. This means that the result is usually higher desirable oil content, with less potential loss of more volatile components. Further, it is also possible to further process dry sieved materials, such as with ice slurry extractions to break oily trichome glands, or the resin bearing portion thereof, away from extraneous matter and remove polar components from plant material (most notably pigments, chlorophyll).

Alternatively, depending on the plant species and the method of separation in the vessel 135, it may be possible to simply place the trichome containing plant matter directly in the brine or fluid and perform the agitation, chopping or grinding in the same vessel 135 as used for separation. Such a method can deploy in the simplest state a hand held kitchen immersion mixer/blender, or the industrial equivalent thereof.

In addition to trichomes and trichome glands of various sizes, significant amounts of undesirable plant matter are released with a mixture of desirable trichomes as this undesirable plant material is frequently of comparable size. Further sieving (optional step 120), can be used to provide one or more cuts or fractions of trichomes and plant matter of different pre-determined size ranges between a lower bound represented by the opening in the next smallest filter, and an upper bound by the previous filter opening size, which is optionally the original mesh bag used in the agitated water bath in step 110.

One such separation method is disclosed in issued U.S. Pat. No. 8,640,877 (*Pastorius*, Feb. 4, 2014) for a pollen separator, which is incorporated herein by reference. Various raw plant materials are processed via such water and ice agitation method. It further suggests that small diameter mixtures of plant pollen and plant debris are separated by eight sieves, having progressively smaller holes from 220, 190, 160, 120, 90, 73, 45 to 25 microns. However, the patent is silent on separating the desired pollen or other components from plant debris of the same size, other than by solvent extraction. Similarly, U.S. Pat. No. 4,051,771 (Miyata, et al., Oct. 4, 1977), which is also incorporated herein by reference, discloses an apparatus for obtaining lupulin-rich products from hops, in which lupulin glands or trichomes are extracted by a combination of crushing and dry sieving in a frozen state.

Trichomes and trichome glands vary in size as plants mature. It is believed that trichomes of different sizes will have correspondingly different chemical compositions.

In the case of medicinal *cannabis* preparation, the trichomes in the 74 to 119 micron diameter range are generally considered to be the most desirable for potency) as the dry weight percentage of desirable substances in this size fraction range is significantly higher than in larger fractions (circa greater than 119 microns). This is likely to be the results of larger particle size fractions, which is with trichomes of 119 microns or greater being diluted by a disproportionate excess of plant matter that is not otherwise separable by mechanical sieve fractionation. In other words, fractions containing trichomes greater in size than about 119 microns would contain a larger proportion of plant matter, resulting in a dry weight lower concentration of the desired medicinal compounds available almost exclusively in the trichome glands.

As it would be desirable to fractionate trichomes based on size, depending on the chemical composition(s) of interest, there is a need for a separation process that does not chemically extract undesirable plant matter and/or chemically modify or oxidize the target terpenoids or terpene derivatives in the separation process. By terpene derivative, I mean terpene compounds and metabolic compounds formed by further synthesis within the glands. Such terpene derivatives include cannabinoids, terpenoids and related resinous compounds.

It has been discovered that sieve filter fractions that contain a higher percentage of undesirable plant matter in relation to desirable trichomes of the same size, can be processed without polar or non-polar solvents that would co-extract undesired chemical compounds from both the undesirable trichome parts (e.g. stalks and disc-cells) and the plant matter of the same size.

Then, in step 130, one of more fractions containing trichomes of a desired size can be further treated to remove unwanted plant matter of the same size. The excess water, that is free draining water or water easily removed by modest pressure, from the sieve fraction is preferably removed, and the remaining solids are disposed on the surface of a tank or vessel 131 containing an inert fluid 135 with a specific gravity greater than that of the net specific gravity of the target trichomes, which is generally but not exclusively greater than about 1.1 gm/cc or greater. The fluid density is more preferably 1.3 or greater As shown in FIG. 2A, after sufficient agitation to wet or introduce all of the mass 121 to the fluid 135, the heavier typically more cellulosic fractions including vegetative matter, disc cells, broken and visibly oxidized trichome glands and non-gland portions of trichomes (stalks) sink 123, separating at the bottom portion 132 of vessel 131. The lighter fraction 122, containing resin filled trichomes float on fluid 135 (FIG. 2B).

Accordingly, a preferred embodiment of the invention disclosed herein is the separation of *cannabis* trichomes from *cannabis* vegetative matter in the size range of 160 microns and greater, and more preferably 90 microns and greater. However, the inventive method will remove undesirable plant components from small size fractions as well. It should be noted that below 160 microns, the main contaminant in *cannabis* is actually the trichome stalks and other non-glandular trichome parts. Unexpectedly, I also observed visibly broken and oxidized glands only in the sinking fraction 123 as described below with respect to step 130, while the floating fraction 122 contained only full, bulbous clear trichome heads.

Depending on the plant variety and the ease of trichome release without fragmentation, it may be desirable to avoid chopping, grinding and fragmentation until the weakly bound trichomes are released by minimum physical agitation, such as by shaking and agitating without chopping or grinding. For example, the initial shaking may deploy a sieve with 220 micron holes.

Further, prior to step 130, post-sieved material may undergo further physical separation by agitation in fluid slurry may contain solid matter such as ice, ceramic beads, and the like, as well as chemical agents, such as wetting agents, dispersion agents, ionic and/or non-ionic surfactants, saponification (soaping) agents, anti-foaming agents and the like.

The separating medium 135 is a dense inert fluid that is easily removed from the desired lower density trichomes, and also preferably has a low solubility of oxygen, or oxygen is readily removed by sparging with inert gases such as carbon dioxide, nitrogen and argon to prevent oxidation.

The inert fluid is more preferably a brine that can be formed by the super saturation of water with a soluble salt, such as sodium chloride, magnesium chloride or magnesium sulphate, and the like. For example, hot water can dissolve about 350 gm/L of common salt (sodium chloride), of which upon cooling some will precipitate, leaving dense salt saturated brine with a specific gravity greater than about 1.18 gm/cc. The separating fluid 135 may include ionic and non-ionic surfactants or any other such agent that facilitates the dispersion of desired glandular trichomes in the floating fraction 122 from undesirable components that form the sinking fraction 123.

It is also preferable to deploy moderate agitation to optimize dispersion of the plant matter-trichome mixture 121 as to facilitate the physical separation of the plant matter 123 which sink and the trichome-rich layer 122 which float. Agitation may be achieved by one of or any combination of reciprocal plunging, shaking, stirring, re-circulating water jets. Agitation may also be achieved via acoustic energy via submerged ultrasonic probes or loudspeaker outside of the vessel. Sound vibrations of a particle frequency range may be operative provide controlled and measurable mechanical separation energy into the fluid trichome/brine solution. This energy will be used to help further disperse all particles so that they may separate based on density while minimizing flocculation, clumping, Van der Wals forces, etc. Agitation can also be achieved by jets of compressed gas, such as air or more preferably nitrogen or inert gas.

It is preferred to use cold brine as fluid 135, and more preferably dry ice chilled brine so the resin filled trichomes and the more volatile isoprene or terpenoid compounds are precluded from evaporation and oxidation in the carbon dioxide ($CO_2$) saturated environment.

The lower portion of vessel 131 is preferably shaped as an inverted cone, so that the vegetative fraction 123 can be drained as shown by the arrow in FIG. 2B, by opening the valve 133. Alternatively, or in addition to, the trichomes floating on the top of the fluid 135 in the vessel 131 can be removed (step 140) from the vessel by a fine screen or mesh into the fluid to lift them from underneath, and/or draining the plant matter from the bottom of the vessel either before or after using the screen.

Maintaining cold temperatures in fluid 135 will have a dramatic effect on reducing the cohesive nature of the often sticky desirable oil-containing glands from less desirable material in mixture 121. By reducing cohesion in mixture 121, the efficiency of the separation of trichome rich floating 122 from the undesirable sinking fraction 123 is facilitated. An optimized dispersion of mixture 121 is believed to yield a floating fraction 122 having a higher desirable oil content. Maintaining cold temperatures may also reduce the chemical degradation as well as evaporative loss of certain and/or more volatile desirable components. Further, it is also possible to further process mixture 121 obtained from dry sieving, such as with ice slurry extractions to break oily trichome glands, or the resin bearing portion thereof, away from extraneous matter and remove polar components from plant material (most notably pigments, chlorophyll) otherwise removed in 100.

After physical separation of the floating desired trichomes, the trichomes may be further washed to remove the salt from the brine (step 140), after which the resulting product is then rinsed preferably with water, particularly when the liquid 135 is a salt brine or another non-solvent, to remove this liquid 135 (step 150).

Depending on the amount of undesirable plant material in any sieve fraction, or bulk mass or material introduced to the fluid 135 in vessel 130, it is preferable to repeat the floating in step 130 multiple times after draining off the sinking vegetative fraction 123 via valve 133.

During such repetitive floating in step 130, as the brine or fluid 135 is replaced, the specific gravity thereof may be adjusted in order to optimize the separation of the desired glandular trichome components from the undesirable components from different sieve fractions or the previous draining step. It is believed that desirable and undesirable components from each of the sieve fractions may have correspondingly unique components with unique properties. Such modification to the fluid in step 130 may include one or more of adjustments, to the composition, i.e. type of salt, concentration of salt to vary the specific gravity, as well as the temperature, which will also affect the specific gravity.

The trichomes can be further processed (optional step 160) to remove or extract the desired chemical compounds from the cell walls and nuclei, with any known or subsequently discovered solvent and/or process methods. Alternatively, the lighter fraction 122 (containing resin filled trichomes float on fluid 135) may be treated with a flocculating agent to aid in recovery of the trichomes. The inventive process may be useful for the purpose of separating non-oil containing products (e.g. the trichome stalk), which are expected to float in the vessel 130 between the floating lighter fraction 122 and sinking fractions 123. These components may prove to have additional uses such as a replacement for DE (diatomaceous earth).

In particular, the invention is applicable to all plants from families with glandular trichomes, for example Asteraceae (sunflower, etc.), Solanaceae (tomato, tobacco, potato, pepper, eggplant, etc.), Cannabaceae (*Cannabis sativa, Humulus,* H. *Lupulus*) and Lamiaceae (mint, basil, lavender, thyme, etc.). In a non-limiting manner, the invention can apply to trichomes of plants from the following genera: *Populus, Nicotiana, Cannabis, Pharbitis, Apteria, Psychotria, Mercurialis, Chrysanthemum, Polypodium, Pelargonium, Mimulus, Matricaria, Monarda, Solanum, Achillea, Valeriana, Ocimum, Medicago, Aesculus, Plumbago, Pityrogramma, Phacelia, Avicennia, Tamarix, Frankenia, Limonium, Foeniculum, Thymus, Salvia, Kadsura, Beyeria, Humulus, Mentha, Artemisia, Nepta, Geraea, Geraniaceae, Pogostemon, Majorana, Cleome, Cnicus, Parthenium, Ricinocarpos, Hymennaea, Larrea, Primula, Phacelia, Dryopteris, Plectranthus, Cypripedium, Petunia, Datura, Mucuna, Ricinus, Hypericum, Myoporum, Acacia, Diplopeltis, Dodonaea, Halgania, Cyanostegia, Prostanthera, Anthocercis, Olearia, Viscaria.*

Preferably, the plant is a plant from the Cannabaceae or Lamiaceae family. In a more preferred embodiment, the plant belongs to the genera *Humulus* or *Cannabis*, both members of the Cannabaceae family. The hop plant, *Humulus lupulus*, produces glandular trichomes containing humulone and lupulone which are important in beer brewing both from organoleptic and microbial-stability impact. *Cannabis* produces pharmaco-active and non-pharmaco active compounds. Compounds biosynthesized in the glandular trichomes of hops have anti-bacterial properties and recently have been investigated in the development of drugs used to treat diabetes. Compounds biosynthesized in the glandular trichomes of *Cannabis* may have anti-epileptic, anti-emetic, anti-inflammatory, neuroprotective and even anti-cancer properties.

The inventive process is also applicable to trichomes from one genetically distinct organism being grown on another, a genetically modified organism, (GMO). An example of this would be transgenic algae (or fungi such as *Aspergillus*) engineered to produce oil trichomes and associated oils from *Cannabis*. Hence, the invention is also applicable to extracting cannabinoids, terpenoids, and related terpene derivative compounds from plants, fungi or algae of any species, including transgenic organisms that express one or more nucleic acid encoding a protein associated with the metabolic pathway to synthesize such compounds.

This process could be employed in a manner similar to the production of ascorbic acid (vitamin c) in a continuous-flow or batch production schematic. In this case, the fungus *Aspergillus niger* is genetically engineered to produce vitamin C.

It should also be appreciated that trichomes, glandular or otherwise, are frequently involved in allelopathy. This invention may allow for the production of new botanically sourced pesticide compounds, previously cost-prohibitive, to research and/or produce. One such example is the separation of nicotine containing trichome from tobacco leaves, which is used as a very potent insecticide, as well as insecticidal agents in trichomes on tomato leaves and stalks.

Density based isolation of the trichome cells has been limited to laboratory scale extraction for research purposes that are unsuitable for commercial production. Such density extraction methods use the Percoll™ reagent to form density gradients in test tubes when subjected to very high centrifugal forces from a centrifuge apparatus. This technique creates a gradient with the Percoll reagent, within which fine layered bands of different density materials will separate.

Such methods are not suitable for production purposes for several reasons. First, the Percoll suspension introduces contamination in the form of silica nanospheres and the repellant coating. This material cannot be removed after separation due to the nano size. Percoll reagent, in addition to being a contaminant is an expensive material. Hence, It is only suitable for research purposes in extracting small quantities of cell or organelles, usually by forming a density gradient by centrifuging. Though density gradients can be formed by layering methods, the introduction of any reasonable quantity of macerated plant matter will require mixing that will disturb such a gradient Prior art wet sieving extraction processes for Cannabaceae trichomes yield an inseparable mix of desirable trichomes and undesirable plant debris, based on size as well as the duration and intensity of agitation. Such a process is generally disclosed in the International Patent Application with publication no. WO 2014/00919A2 (to J. P. Love, which published (January 2014), and is incorporated herein by reference. Smaller size fractions of plant material tend to yield a greater amount of desirable trichomes and therefore a higher yield of desired substances. However, the greater the amount of agitation of plant material, the greater the concomitant release of both desirable and undesirable substances from plant material regardless of particle size restrictions.

Hence, such a prior art water extraction processes has 2 primary limitations. First the total yield of trichome resin is limited to the smaller trichomes. While the extraction of resins from other trichome bearing plant matter can be accomplished with solvents, these processes are less desirable as mentioned in the background section. As the total yield of desirable substances from this remaining plant matter will be low, they are even less economically attractive than using only solvent extraction.

The second limitation is the total concentration of cannabinoids resins. The state of the art water extraction processes result in up to about 60-70% THC and related resins, which is comparable to solvent extraction. State of the art water extractions yielding material with 60-70% by weight total cannabinoid resins, including THC. Such water extraction products utilize a significantly smaller portion of the total THC bearing trichomes as these extracts are limited, at best, to particle sizes of 90 to 45 microns. Although, occasionally some strains of *cannabis* yield material that qualifies as "ice wax" from the 120 micron fraction.

In a currently preferred embodiment, the total yield of cannabinoids resins, based on weight of starting plant matter, is higher than current water extraction methods by a factor of about 2×( usually 3 to 6% of the total plant matter), with the resulting product being purer, containing 70-75% by weight total cannabinoid resins.

It has been discovered that such higher yields and greater extraction efficiency can be achieved by a totally different approach. Rather than gentle agitation of plant matter to sever the more trichomes with respect to undesirable plant debris, a greater variety of plant material is aggressively macerated to release all size trichomes as well as an abundance of undesirable plant debris. While this produces undesirable plant debris of all sizes, including trichome head or resin sacks, it has been discovered that the gravity separation process, in a uniform density fluid, is best optimized for each size fraction, which is floated in a different vessel from the other size fractions. More preferably, each size fraction is separated in a different density fluid, which is preferably a brine or salt solution. Each fraction is obtained by draining the cold agitated slurry of plant matter and ice water through a 220 micron opening mesh bag into a vibratory screen stack with constant cold water flushing. The preferred screen sizes, indicated by the size range of the retained fractions, is provided in Table 1. Each sieve size fraction is then floated in a separate brine bath (FIG. 3), as the smaller fractions take longer for complete gravity separation, in that once the fraction is covered in the brine, the smaller desirable resin heads take longer to float free of the undesirable heavier matter. Alternatively, if the sieve fraction is washed into the top of a tank of brine, it takes longer for the undesirable matter to sink. It is also preferable that the brine salt is a magnesium sulfate brine, and most preferable that it contains about 10 wt % sodium chloride as a deflocculating agent in the density separation process after sieving. The use of sodium chloride alone is problematic in that it is difficult to rinse the residual salt, which negatively effects the taste and flavor profile of the product. In contrast, the preferred brine composition can be readily rinsed in a final step without leaving detectable residue. The use of 10% sodium chloride aids in deflocculating of agglomerated matter, so the denser undesirable matter separates from lighter matter and sinks.

As the undesirable stalks and desirable resin heads in the smaller size fractions segregate in the floating step significantly slower than in the larger size fractions, it is also desirable to use a greater density fluid or brine for these smaller fractions, as disclosed in Table 3. Further, by separately treating the more slowly segregating components of smaller sizes the tanks sizes and or tank number for the floating step can be adjusted to accommodate the different separation rates. In other words, tanks used for the heavier fractions will be cycled faster, so the larger or more numerous tanks for the smaller fractions can provide a comparable process throughput. Using a more dense brine for the smaller fractions with the most desired salt composition accelerates the gravity separation process.

The preferred brine compositions also enhances the separation of trichome fragments, namely the undesirable stalk and disc cells from the resin bearing sacks at the end of the disk cells. Unless the trichomes are extremely mature, the stalks due to their length, can be a significant fraction of the total trichome volume. Additional dilution of desirable substances results from the introduction of non-glandular trichomes known as cystolith hairs. Cystolith hairs are composed mainly of silicon dioxide ($SiO_2$) and frequently contain calcium carbonate ($CaCO_3$) crystals within.

The current preferred concentrations of brine for each sieve fraction as listed in Table 1:

TABLE 1

| Sieve size (microns) (particles this size and larger) | Brine density (gm/cc) | Brine salt composition, (by wt %) | Control (gm from 1 Kg. plant matter, dried, without gravity separation) | Separated (gm), after gravity separation in indicated brine | Fraction recovery, % with respect to Control |
| --- | --- | --- | --- | --- | --- |
| 125-220 | 1.11 | 90/10% MgSO4/NaCl | 4.45 | 2.36 | 53% |
| 105-124 | 1.12 | 90/10% MgSO4/NaCl | 5.25 | 3.21 | 61% |
| 90-104 | 1.13 | 90/10% MgSO4/NaCl | 6.97 | 6.15 | 88% |
| 70-89 | 1.14 | 90/10% MgSO4/NaCl | 16.84 | 14.03 | 83% |
| 50-69 | 1.15 | 90/10% MgSO4/NaCl | 16.71 | 7.26 | 43% |
| 40-49 | 1.15 | 90/10% MgSO4/NaCl | 2.5 | 1.09 | 44% |
| Total recovery | | | 52.7 gm | 34.1 gm | 0.65% |

The results in Table 1 were obtaining starting with 1,000 gm of plant matter from the *Cannabis* plant O.G. Kush variety "Tahoe" (usually referred to as "Tahoe O.G".). Hence, the total yield of resin heads without other matter was 3.4%. Other varieties have yielded as high as 6% with about 74.5% total cannabinoids by weight.

Figure 3:
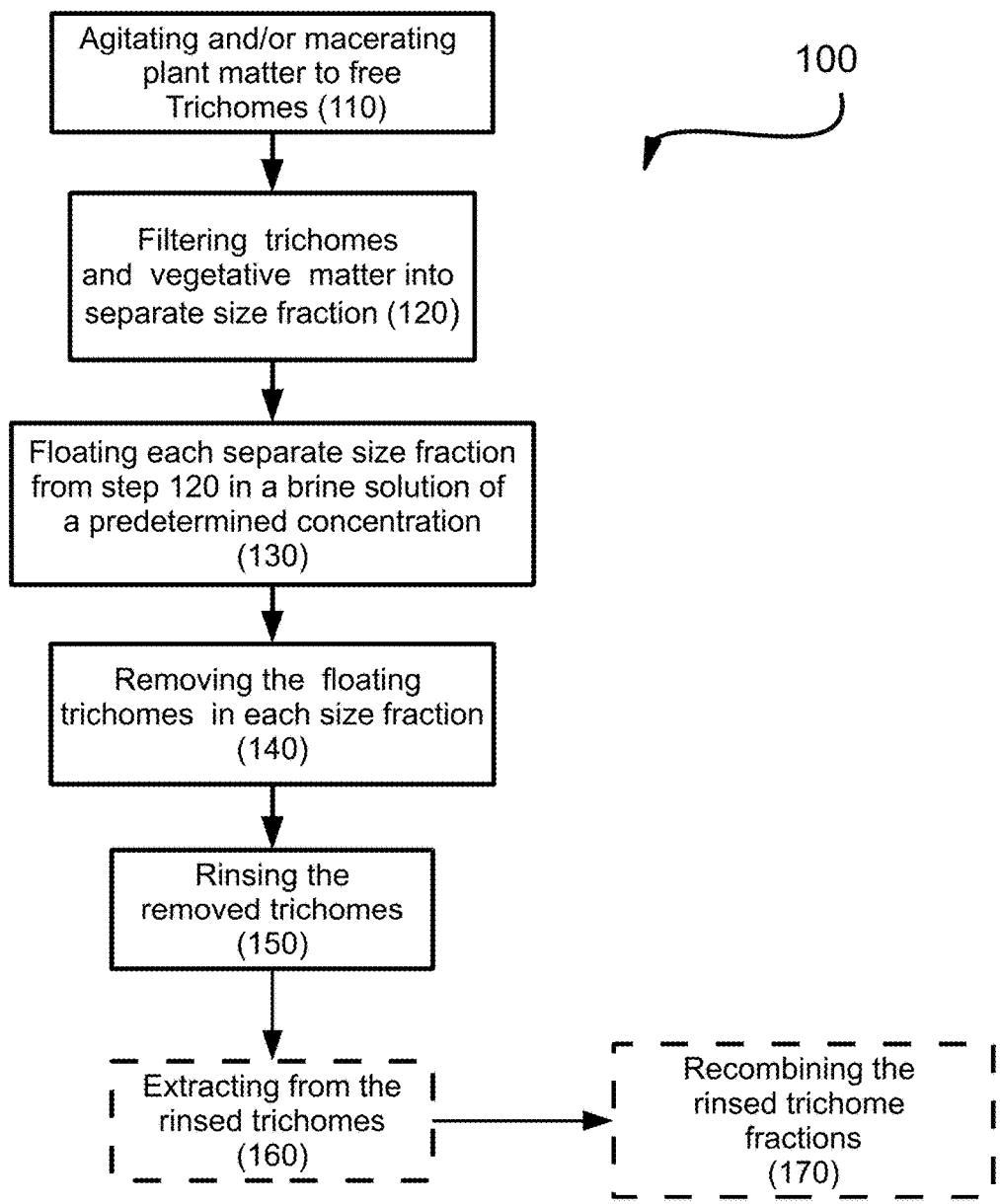
FIG. 3 is a schematic flow chart of a more preferred embodiment of the process.

This improved process is illustrated in FIG. 3 in which in step 130, each sieve fraction is separately floated. In step 170, the trichomes from each fraction are optionally recombined at the end. The optional solvent separation step, 160, can be performed before or after the recombination. To the extent plants can be bred to create different chemical species in different size trichomes, it may be desirable to perform the solvent extraction from each trichome size fraction separately. As the trichome fraction are largely free of vegetative matter, the undesired components (lipids/waxes, pigments) of associated plant material will not be co-extracted.

It is important to use a brine that does not contain or introduce solid particle of any type, other than agents that can generally be washed or removed in subsequent processing, that is the brine should consist essentially of water and a salt or salt mixture, which can include other water soluble compounds and additive. Brine salts are the primary components responsible for the greater density than water, and as such constitute the essential character of this aspect of the invention.

After the desired fractions that float are removed from the sinking fractions, they are rinsed to remove brine. The rinse water is easily purified by reverse osmosis, which generates more brine for reuse in the process, after appropriate modifications of concentration to achieve the preferred density.

Figure 4:
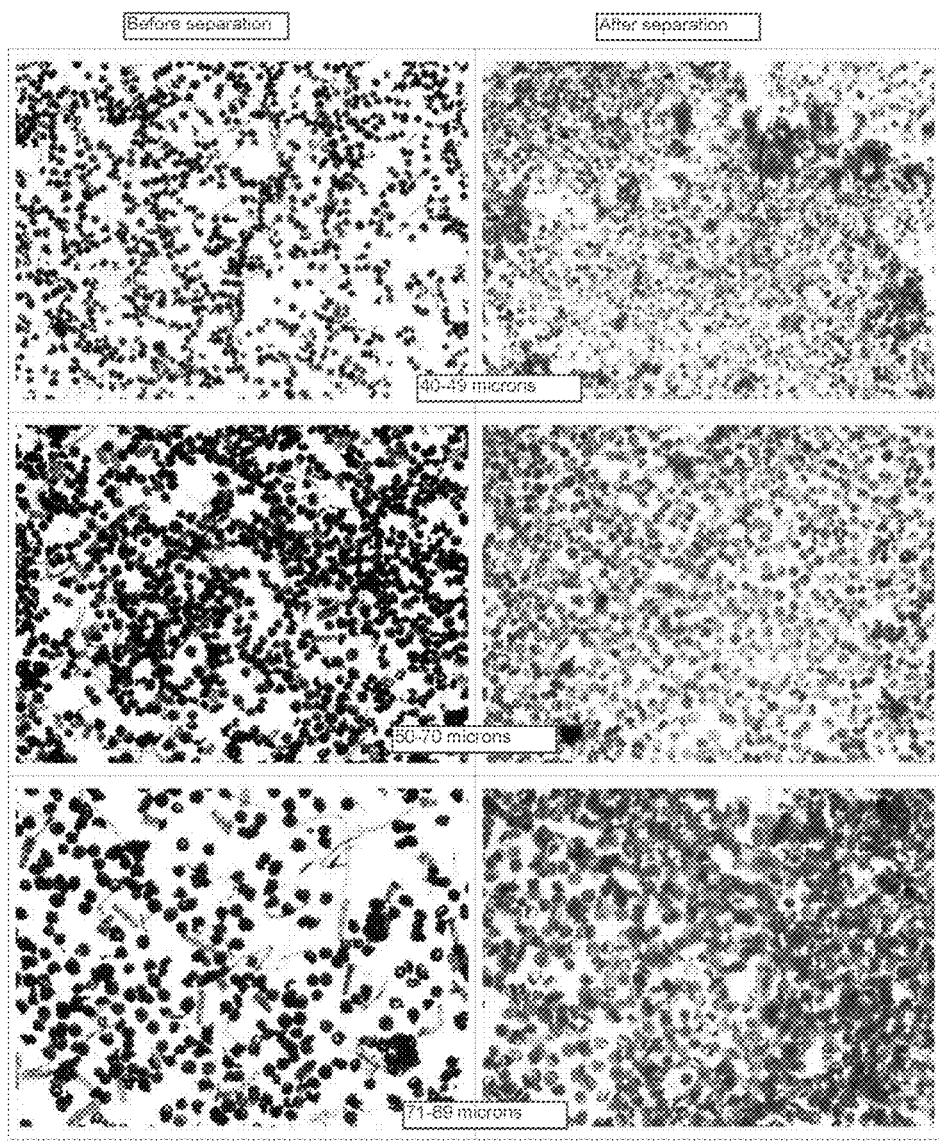
FIG. 4 compares in optical micrographs the three indicated size fraction after wet sieve separation and before and after separation in different brine solutions.
Figure 5:
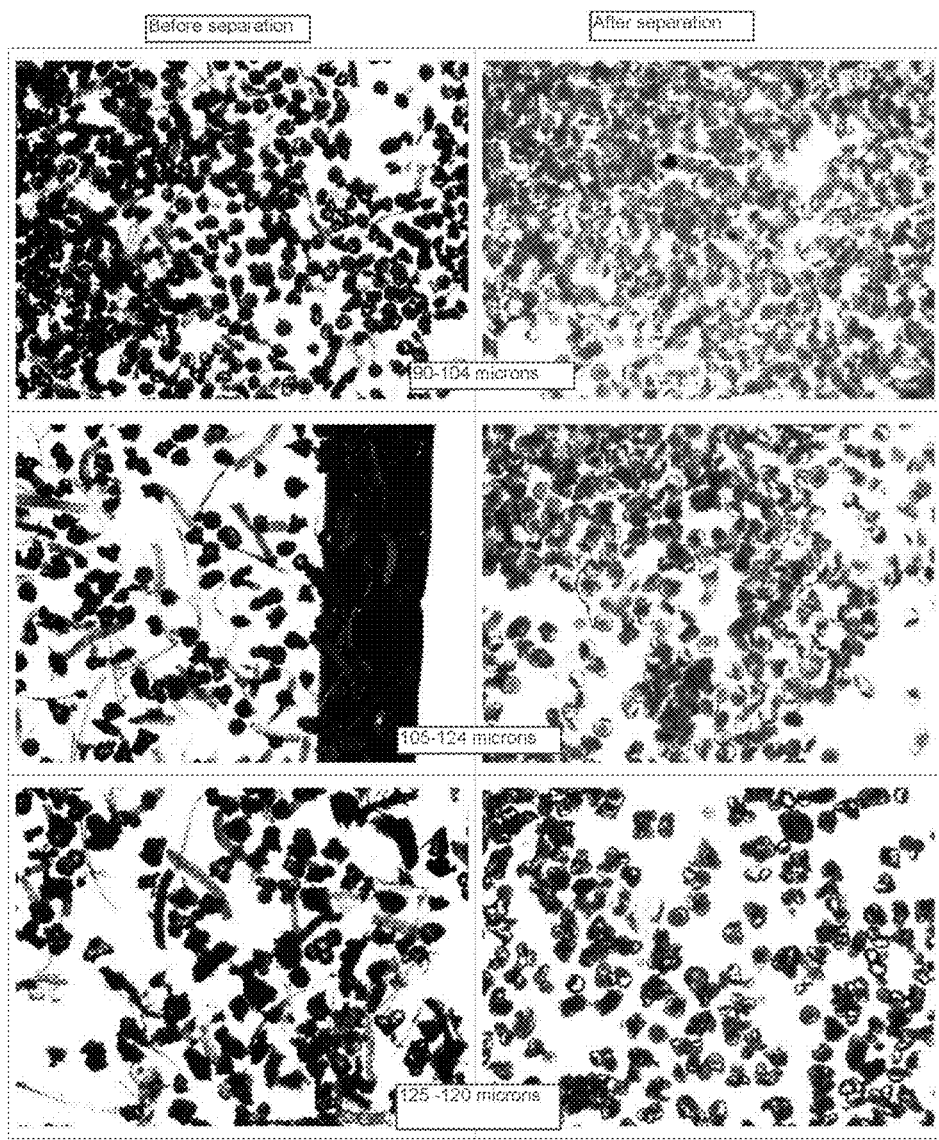
FIG. 5 compares in optical micrographs the three indicated size fraction after wet sieve separation and before and after separation in different brine solutions.

It has been discovered that as the preferred process results in a resin product that is more pure, as it has a lower ratio of stalks, cystolith hairs and other undesirable plant debris to trichome resin heads, as shown in the micrographs in FIGS. 4 and 5. While each sieve fraction in the left column in these Figures contains stalks, plant debris and globular resin heads, the right column show the floating matter that has been collected according to the conditions of Table 1 is full, bulbous clear trichome heads that are essentially free of stalks, cystolith hairs and other undesirable plant debris.

As the trichome fractions once separated as shown in FIGS. 4 and 5 in the right hand column are essentially resin heads free of stalks, cystolith hairs and other undesirable plant debris, the can be recombined to yield a final resin product of about 3.4 grams, with between about 70-75 weight percent total active cannabinoids, based on prior experimental results been measured by high performance liquid chromatography.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

All of the above methods described generally and more specifically with respect to Cannabaceae trichomes, are also applicable to separating and/or purifying trichomes from the other plant species, with appropriate adjustment in the fluid 135 to account for the density variation of the trichomes and other objective of the separation process. The density of the trichomes will depend largely on the plants species, which have different biochemical processes during plant growth, and can also vary with the growth stage and maturity of the plant. For example, in the case of the trichomes from the hop plant they contain varying percentages of alpha acids or humulones, beta acids or lupulones, essential oils (such as the terpene hydrocarbons myrcene, humulene and caryophyllene, among many other), and flavonoids, primarily xanthohumol, as well as 8-prenylnaringenin and isoxanthohumol. As many of these compounds have long chains of olefin hydrocarbons, the density of the trichomes can be significantly lower than those of other plants species. Hence, it may be preferable to float or suspend such glandular trichomes, depending on the plant species, on the brine or fluid 135 having a higher density than the trichome, which in the case of hops trichomes, among others, is preferably greater than about 1.08 gm/cc, more preferably greater than about 1.05 gm/cc and most preferably greater than about 1.01 gm/cc.

Further, while it is preferable that the fluid be a brine salt, other fluids can be used if it is desirable to avoid extraction of water soluble trichome components in the aqueous brine, such as organic compounds, and more preferably continuous phase organic compounds without suspended matter. Moreover, as the essential objective is to separate the trichome from other plant matter, so long as the plant matter, and particularly any macerated plant matter, sinks in the fluid faster than the trichome, the sinking plant matter can be removed before the released trichomes have floated to the top of the fluid 135. This particularly is the case when the released trichomes float relatively slowly due to a small size, and the larger plant matter sinks faster.

Further, depending on the nature of the fluid 135, the residue after the trichomes are removed may be de-minimus or inconsequential with respect to the intended purpose of the resulting product, and further rinsing of fluid and/or drying may not be necessary or may essentially occur as a result of further purification of separation of chemical compounds in the trichomes, or reactions, such as forming chemical derivatives of compounds in the trichomes to create novel compounds as flavoring agents, medicines, insecticides, insect attractants, insect repellants and like.

I claim:

1. A method of trichome separation from plants, the method comprising the steps of:
   a) obtaining a trichome bearing plant material,
   b) agitating the plant material,
   d) introducing the plant material in fluid having a density of at least about 1.01 gm per cc to float the trichomes on the fluid,
   e) removing the floating trichomes,
   f) rinsing the removed trichomes to remove a residue of the fluid, and
   g) drying the rinsed trichomes.

2. The method of trichome separation from plants according to claim 1 wherein the fluid has a density of at least about 1.05 gm per cc.

3. The method of trichome separation from plants according to claim 1 wherein the fluid has a density of at least about 1.08 gm per cc.

4. The method of trichome separation from plants according to claim 1 wherein said step of agitating the matter includes aggressive maceration of the plant material as the trichomes are released there from such that the macerated plant material will sink in the fluid.

5. The method of trichome separation from plants according to claim 1, wherein said step of agitating occurs before the plant material is introduced into the fluid having a density of at least about 1.01 gm per cc.

6. The method of trichome separation from plants according to claim 1, wherein said step of agitating occurs after the plant material is introduced into the fluid having a density of at least about 1.01 gm per cc.

7. The method of trichome extraction from plants according to claim 1 wherein the plant is a from a genera selected from the group consisting of *Populus, Nicotiana, Cannabis, Pharbitis, Apteria, Psychotria, Mercurialis, Chrysanthemum, Polypodium, Pelargonium, Mimulus, Matricaria, Monarda, Solanum, Achillea, Valeriana, Ocimum, Medicago, Aesculus, Plumbago, Pityrogramma, Phacelia, Avicennia, Tamarix, Frankenia, Limonium, Foeniculum, Thymus, Salvia, Kadsura, Beyeria, Humulus, Mentha, Artemisia, Nepta, Geraea, Geraniaceae, Pogostemon, Majorana, Cleome, Cnicus, Parthenium, Ricinocarpos, Hymennaea, Larrea, Primula, Phacelia, Dryopteris, Plectranthus, Cypripedium, Petunia, Datura, Mucuna, Ricinus,*

*Hypericum, Myoporum, Acacia, Diplopeltis, Dodonaea, Halgania, Cyanostegia, Prostanthera, Anthocercis, Olearia, Viscaria.*

8. The method of trichome extraction from plants according to claim 6 wherein said agitating during said step of floating is by one of more of shaking, stirring, re-circulating water jets, and agitation with ultrasound.

9. The method of trichome extraction from plants according to claim 1 wherein the plant is a from a genera selected from the group consisting Cannabaceae and Lamiaceae family.

10. A method of trichome separation from plants, the method comprising the steps of:
   a) obtaining a trichome bearing plant material,
   b) agitating the plant material,
   d) introducing the plant material in fluid having a density of at least about 1.01 gm per cc to float the trichomes on the fluid,
   e) separating the floating trichomes from the fluid,
   f) removing any residue of the fluid from the separated trichomes.

11. The method of trichome separation from plants according to claim 9 wherein the fluid comprises at least one salt dissolved in water.

12. The method of trichome separation from plants according to claim 9 wherein the step of removing any residue of the fluid from the separated trichomes comprises rinsing the trichomes to remove any salt residue.

13. The method of trichome separation from plants according to claim 10 wherein the fluid has a density of at least about 1.05 gm per cc.

14. The method of trichome separation from plants according to claim 10 wherein the fluid has a density of at least about 1.08 gm per cc.

15. The method of trichome separation from plants according to claim 10 wherein said step of agitating the matter includes aggressive maceration of the plant material as the trichomes are released there from such that the macerated plant material will sink in the fluid.

16. The method of trichome separation from plants according to claim 10, wherein said step of agitating occurs before the plant material is introduced into the fluid having a density of at least about 1.01 gm per cc.

17. The method of trichome separation from plants according to claim 10, wherein said step of agitating occurs after the plant material is introduced into the fluid having a density of at least about 1.01 gm per cc.

18. The method of trichome extraction from plants according to claim 10 wherein the plant is a from a genera selected from the group consisting of *Populus, Nicotiana, Cannabis, Pharbitis, Apteria, Psychotria, Mercurialis, Chrysanthemum, Polypodium, Pelargonium, Mimulus, Matricaria, Monarda, Solanum, Achillea, Valeriana, Ocimum, Medicago, Aesculus, Plumbago, Pityrogramma, Phacelia, Avicennia, Tamarix, Frankenia, Limonium, Foeniculum, Thymus, Salvia, Kadsura, Beyeria, Humulus, Mentha, Artemisia, Nepta, Geraea, Geraniaceae, Pogostemon, Majorana, Cleome, Cnicus, Parthenium, Ricinocarpos, Hymennaea, Larrea, Primula, Phacelia, Dryopteris, Plectranthus, Cypripedium, Petunia, Datura, Mucuna, Ricinus, Hypericum, Myoporum, Acacia, Diplopeltis, Dodonaea, Halgania, Cyanostegia, Prostanthera, Anthocercis, Olearia, Viscaria.*

19. The method of trichome extraction from plants according to claim 17 wherein said agitating during said step of floating is by one of more of shaking, stirring, re-circulating water jets, and agitation with ultrasound.

20. A method of trichome separation from plants, the method comprising the steps of:
   a) obtaining a trichome bearing plant material,
   b) agitating the plant material to release trichome from the plant material,
   d) introducing the plant material in fluid having a density of at least about 1.01 gm per cc the plant matter from which trichomes were released sinks in the fluid,
   e) separating the trichomes from the fluid,
   f) removing any residue of the fluid from the separated trichomes.

21. The method of trichome separation from plants according to claim 20, wherein said step of agitating occurs before the plant material is introduced into the fluid having a density of at least about 1.01 gm per cc.

22. The method of trichome separation from plants according to claim 1, wherein said step of agitating occurs after the plant material is introduced into the fluid having a density of at least about 1.01 gm per cc.

* * * * *